United States Patent [19]
Behel, Jr. et al.

[11] Patent Number: 5,632,799
[45] Date of Patent: *May 27, 1997

[54] DRIED PARTICULATE, HYDROPHILIC GEL AS MICRONUTRIENT DELIVERY SYSTEM

[75] Inventors: Allan D. Behel, Jr., Florence, Ala.; John J. Mortvedt, Fort Collins, Colo.

[73] Assignee: Tennessee Valley Authority, Muscle Shoals, Ala.

[*] Notice: The term of this patent shall not extend beyond the expiration date of Pat. No. 5,221,313.

[21] Appl. No.: 311,228

[22] Filed: Sep. 23, 1994

[51] Int. Cl.$^6$ ................... C05D 9/00; C05G 3/04
[52] U.S. Cl. ............ 71/63; 71/64.11; 252/315.2; 523/123; 524/916
[58] Field of Search .............. 252/315.1, 315.2; 71/27, 63, 58, 53, 64.09, 64.11; 523/123; 524/916

[56] References Cited

U.S. PATENT DOCUMENTS

| | | | |
|---|---|---|---|
| 2,813,014 | 11/1957 | Allison et al. | 71/63 |
| 4,396,412 | 8/1983 | Heller et al. | 71/27 |
| 4,583,320 | 4/1986 | Redenbaugh | 47/58 X |
| 4,762,545 | 8/1988 | Youssef et al. | 71/27 |
| 5,112,902 | 5/1992 | Moriya et al. | 524/916 |
| 5,185,024 | 2/1993 | Siemer et al. | 71/64.09 X |
| 5,221,313 | 6/1993 | Mortvedt et al. | 71/63 |

OTHER PUBLICATIONS

Hawley's Condensed Chemical Dictionary, Eleventh Edition, (Van Nostrand Co., Inc., 1987), p. 486.

Primary Examiner—Richard D. Lovering
Assistant Examiner—Daniel S. Metzmaier
Attorney, Agent, or Firm—Robert A. Petrusek

[57] ABSTRACT

The inclusion of certain organic hydroxy acids, most notably citric acid, in the iron sulfate formulations of at least one prior art hydrophilic polymer delivery system followed by drying and crushing the product into particles has been found to significantly improve the efficiency and ease of application of iron source fertilizer materials for iron-sensitive plants growing on iron-deficient soils for periods exceeding one year. The dried particles most preferably may be selectively metered into soil in or near the seed row as a band application at or prior to planting or spot placed in the root zone of growing plants in soil. The dry band absorbs soil moisture to provide a unique environment which restricts contact of soluble iron fertilizers with the soil and provides for complexation of iron in the formulation with organic hydroxy acids also contained in the formulation, thereby minimizing the extent of chemical reactions with the soil that reduce the availability of the applied iron to plant roots. A unique characteristic of the invention is the maintenance of iron in water soluble plant available form in soil outside the particles or band. Thus, root penetration and proliferation into and around the band also is greater than in the soil matrix, resulting in greater uptake efficiency of applied iron. The ease of precise application to soil, coupled with significantly enhanced crop response and utilization of iron contained in the product, offer considerable advantage over existing iron source fertilizer materials.

11 Claims, No Drawings

DRIED PARTICULATE, HYDROPHILIC GEL AS MICRONUTRIENT DELIVERY SYSTEM

The invention herein described may be manufactured and used by or for the Government for governmental purposes without the payment to us of any royalty therefor.

INTRODUCTION

Chlorosis of plants, which is attributed to iron deficiency, has been widely reported in the open literature for well over a century, yet presently there is no effective, economical method including direct soil application to correct such iron deficiencies in plants. Chlorosis is characterized by a yellowing of plant leaves due to substantially diminished amounts of chlorophyll, the formation of which chlorophyll requires adequate quantities of the micronutrient iron. Theoretically, such conditions could be quickly corrected by application of, either directly to the plant or indirectly to the soil at the plant situs, iron sources which are in a form readily available to such plant. Until the present time, however, numerous problems have been found to exist with many iron-containing compounds which tend to prevent their general use for successfully treating such iron deficiencies in plants. Examples of such problems encountered comprise the cost of the materials, the difficulty of delivery to a crop, the need and expense for multiple applications, and the lack of plant response under various soil conditions wherein iron chlorosis occurs.

The materials most commonly utilized to date for effecting treatment, albeit, not totally successful, of iron deficiencies have been ferrous and ferric sulfates and certain organic iron-containing compounds known as synthetic chelates or natural organic complexes. (John Mortvedt, Iron Sources and Management Practices for Correcting Iron Chlorosis Problems, *Journal of Plant Nutrition* 9:961–974, 1986). While the inorganic ferrous and ferric sulfates are relatively inexpensive, plant response to them has been found to be generally inadequate if they are applied directly to calcareous soils, wherein most such iron deficiencies occur. For instance, it has been long known that subsequent to soil application, iron sulfates quickly react to form compounds such as, for example, ferric hydroxides, the iron values of which are unavailable to plants. While some other sources of iron, generally characterized as chelates, do not react with soil to form unavailable compounds, they are so expensive that their use is restricted to application on high-value crops or for other specialized situations.

Until the present time, the most economical method used to correct iron chlorosis has been multiple and timely foliar applications of ferrous sulfate ($FeSO_4$) to the growing plants. This has been practical only on moderately iron-deficient soils. Economically justifiable results with such periodic foliar application have been poor or are frequently not obtained on soils which are characterized as being very low in available iron. In addition, the timing of foliar spray applications has been found to be quite critical in order to obtain satisfactory correction of the chlorosis condition. It has also been observed by researchers and reported in the literature that the leaves of sprayed plants may be damaged by some foliar sprays containing certain compounds or by sprays containing relatively high salt concentrations of other compounds. In addition, it has been reported that such foliar application, unless continued periodically over a substantial period of time may not be particularly effective since new growth appearing after initial spraying may again be chlorotic. Accordingly, it may reasonably be concluded that foliar spray applications are not always a satisfactory and/or economical method for correcting iron deficiencies in plants.

Until the present time, the second most economical method used to correct iron chlorosis has been a single soil application of a band of hydrated hydrophilic polymer (i.e., in the form of a fluid, thixotropic gel, such as commonly seen in certain gel toothpastes) which contains inorganic iron sulfate (Mortvedt, et. al. U.S. Pat. No. 5,221,313, Jun. 22, 1993). However, these products are relatively expensive, not conveniently applied to the soil, and require specialized application equipment, such as positive displacement pumps, which are not part of the normal inventory of farming equipment.

However, it has now been discovered that many of the shortcomings for treating chlorosis with the invention of Mortvedt, supra, could be overcome by practice of an improvement over said invention. This improvement is an iron delivery system characterized by its ability to effectively isolate, and provide chemical protection by complexing with, for substantial periods of time, the iron sulfates contained and delivered therein from the deleterious effects of various soil constituents which normally give rise to rendering such iron sulfates unavailable to growing plants. In addition, this improvement is in such form that allows for soil situs placement with existing, widely used, and commercially available equipment and is less costly per unit of iron and simultaneously more effective in alleviating iron chlorosis in plants than said hydrophilic delivery systems of Mortvedt, supra. Accordingly, the instant invention is presented in a principal embodiment directed to overcoming the chlorosis problem and an alternative improved embodiment to hydrophilic polymer micronutrient delivery systems directed to delivery and focus for more effective uptake of iron which is known to be required by growing plants.

BACKGROUND OF THE INVENTION

1. Field of the Invention

The present invention relates to the development of inexpensive materials and means to apply them, which materials are eminently suitable for the correction of iron deficiency-induced chlorosis in plants. More particularly, the present invention relates to the development of certain materials selected from the group of gel-forming hydrophilic polymers, comprising polyacrylamides, cellulose ethers, guar gums, propenoate-propenamide, or mixtures thereof, said polymer disposed in combination with citric acid, and the resulting combinations in further combination with certain iron source materials including, but not limited to iron sulfates. Still, more particularly, the instant invention relates to the discovery that certain organic acids, particularly citric acid, if added to the aforementioned already hydrated hydrophilic gel-forming polymers or fluid gels of Mortvedt, supra, will significantly increase the efficacy of the hydrated gels in correcting iron chlorosis of plants. Still, even more particularly, the instant invention relates to the discovery that certain formulations of the hydrated gels which are properly combined with predetermined proportions of citric acid, and from which is removed sufficient moisture to result in a friable material from which particulates are easily recovered can, upon subsequent wetting by water in the soil, react to re-form, in situ, such hydrated gel. The resulting re-formed gel complexes and otherwise protects selected iron compounds to provide an economical and readily available iron source imminently suitable for correcting iron deficiencies in plant life growing at such situs. On the other hand, it has been found that the same gel formulations, sans said citric acid, will not perform in such a desirable manner. Such new and improved product is herein designated as "dried iron-containing gel particles;" "dried gel particles;" or more simply "DGP." It has also now been determined that such DGP most preferably should be band applied in a continuous intact band at or prior to planting, or spot placed in the root zone of growing plants in soil to minimize the contact of these products with the soil so that chemical reactions which adversely affect the availability of iron in these products to plants are minimized. When applied in such fashion, the DGP will hydrate and coalesce to form a continuous, intact gel entity, either in the form of a gel band or other such isolated gel area, in essentially the same final form as the gel delivery system of Mortvedt, supra, but with considerably enhanced ease of application. Moreover and most significantly, the instant invention relates to the discovery that the addition of citric acid to such combinations of polyacrylamide polymers and iron-containing materials causes the formation of a compound or compounds, not previously observed to occur with other hydrophilic polymer/iron source materials, which will diffuse out of the hydrated band of DGP into the surrounding soil as evidenced by a diffuse orange-colored zone or "halo", radiating outward from the band into the soil. This zone, as evidenced by the orange coloration, likely contains iron in an oxidized, water-soluble form. Incomplete polymerization of acrylic acid during polyacrylamide synthesis results in free, water-soluble monomers of acrylic acid within the polymer structure. It is speculated that these monomers react with citric acid and iron to form a cyclic, water-soluble iron complex which diffuses from the gel band into the soil. The bonding strength of the complex for iron is sufficient to prevent soil reactions which result in precipitation of iron as compounds which are unavailable to plants. The acrylic acid alone will not form a sufficiently strong complex with iron to prevent these reactions (log $K°=4.2$ for Fe(II)acrylate). Moreover, and still more significantly, observation of the soil matrix in which this orange-colored zone or halo occurs, clearly shows an unusual propensity of root and root hair growth in the region where DGP was applied, in preference to the surrounding soil matrix. Such root proliferation typically occurs in zones of enhanced fertility in soils, and in such instances where DGP has been applied such enhancement is likely due to a greater concentration of available iron in this zone than in the surrounding soil. This enhanced and concentrated region of root growth occurred to a much lesser extent in like polymer systems which contained iron, but not citric acid, and did not occur at all when iron and citric acid were omitted from otherwise similar formulations.

Furthermore, it has now been discovered that oftentimes the DGP will absorb up to 100 times its own weight in water from contact with moist soil. This process results in swelling of the DGP such that veins or islands of micronutrient-enriched hydrogel are established along with concomitant displacement of the soil around the DGP which results in a zone more easily penetrated and expanded into by plant roots than is a normal soil matrix and which by virtue of copious amounts of water of hydration available to roots growing therein, as well as the abundant supply of micronutrients, provides a region where root growth is substantially enhanced.

In addition, it has now been demonstrated in field testing that such DGP is in a form which may be easily, selectively, and precisely dispensed into soil as a sub-surface band of dry particles by means of a device known in the trade as a pesticide applicator box. This device is designed to contain only small amounts of pesticides, as compared to equipment used for application of major plant nutrients, or "macronutrients", such as nitrogen (N), phosphorus (P), and potassium (K), since such pesticides are normally applied to soil in small amounts (on the order of 1 to 5 pounds per acre, much as with applications of iron) and thus precise metering of the material is required. This precise metering consideration is most important because iron chlorosis resulting from iron deficiencies in soil has been found to occur in separate or isolated areas within any of a number of given fields, which areas range from less than one, up to several acres in dimension, which are oftentimes isolated one from another and which produce little, if any, gainful yield. Unfortunately, currently practiced commercial practices for planting such high pH, calcareous and iron-deficient fields, wherein macronutrients, which are required in large amounts by plants are routinely applied to such areas in a blanket application, do not provide a means which is practical to selectively dispense these micronutrients only in such isolated areas. However, in the practice of the instant invention, if the locations of these iron-deficient areas are known by previous experience, or are otherwise effectively mapped, the DGP can be selectively applied during application of the macronutrients by using a variable rate pesticide applicator box equipped with a banding attachment for subsurface banding of DGP only upon reaching such susceptible areas and not across the whole area of the field. Thus, gainful yields may be realized from areas where before little or none were possible and the added expense of the DGP is therefore more than offset by the increased economic return of such yields.

2. Description of the Prior Art

Iron is an essential element in plant nutrition and generally is classified as a micronutrient. It is known to be involved in the synthesis of chlorophyll which in turn is required for photosynthesis in plants. A deficiency of this micronutrient in growing plants, which can be greatly exaggerated in calcareous type soils, is oftentimes the cause of chlorosis, which is characterized by a yellowing of plant leaves and stems and which results in particularly poor growth.

Currently available practices for alleviating such iron deficiencies in growing plants include the application of synthetic iron chelates to soil or the use of various soluble iron compounds as foliar sprays for direct application to the plants or the use of certain hydrophilic polymer delivery systems. Currently, the least expensive, in terms of up-front per unit cost, water-soluble iron compound in use is iron sulfate, either in its reduced state, e.g., ($FeSO_4$) or in the ferric state, e.g. [$Fe_2(SO_4)_3$]. However, neither form supra, of iron sulfate should be applied directly to soil lest either source quickly becomes combined with certain components in the soil to form water-insoluble compounds thereby rendering such iron unavailable to growing plants.

The synthetic chelate, FeEDDHA [ferric chelate of ethylenediamine (di-(o-hydroxyphenyl acetate))], has long been considered by many skilled in the art to be the most effective iron fertilizer for soil application, especially in calcareous soils (Arthur Wallace, *A Decade of Synthetic Chelating Agents in Inorganic Plant Nutrition*, Edwards Brothers, Inc., Ann Arbor, Mich., 1962). However, the per unit cost of iron in FeEDDHA is quite high, which makes this iron chelate material much too expensive for application to relatively low-value field crops. Another currently available and somewhat less expensive iron chelate material, FeEDTA (monosodium ferric ethylenediamine tetraacetate), has proven to be effective for crops growing in near neutral soils but not in calcareous, high-pH soils wherein most iron deficiencies occur. Another recent discovery also somewhat less costly than chelates, are hydrophilic polymer delivery systems (Mortvedt, supra). However, application of the materials of Mortvedt, is difficult and requires specialized equipment and the polymer in the formulations is also relatively expensive. Nevertheless, the initial per unit cost of iron is significantly lower than in the chelates. Accordingly, it should be readily apparent that iron sulfate would be the most economical and eminently suitable iron source material for use on field crops if it only remained available to growing plants subsequent to its contact or juxtapositioning with the soil situs. Therefore, additives or conditions which can significantly improve the effectiveness of iron sulfate intended for the treatment of chlorosis could, in turn, result in an economically effective iron source for soil application.

Currently, it is the practice in the trade for iron source material to be applied to soil separately or to be incorporated with other materials in the processing or blending of fertilizers or to be applied in a hydrophilic gel polymer matrix. The effectiveness of iron source materials in maintaining a supply of iron to growing plants depends upon the chemical nature of such iron source materials and/or the soil, as well as rate and/or frequency of their application. Economic considerations regarding the use of iron source materials are determined by costs and rate of their application as well as the ease of application relative to the returns attributable to increased yields of the crops to which they are applied. Presently, the most effective iron chelate, FeEDDHA, is so costly that its use is restricted to high-cash value crops such as, for example, apples, grapes, and peaches, or high-cash value ornamental crops such as, for example, rhododendrons, azaleas, and dwarf citrus, while other methods, i.e., fluid hydrophilic polymer delivery systems, are nonetheless still expensive in addition to being difficult to apply and are not as effective as FeEDDHA. The least costly, on a front-end per unit cost basis, iron source materials are ineffective when used in procedures designed to correct iron chlorosis in many lower value field crops, such as, for example, corn, grain sorghum and soybean, which nonetheless are planted in large acreage and constitute the major portion of modern production agriculture.

From the aforesaid, it should now be abundantly clear that the prior art materials designed as, or intended to be, iron sources are too costly up front to be economical for use on most field crops or are difficult to apply and require specialized application equipment, or although available at relatively low unit cost, are still highly uneconomical to use since they are ineffective in maintaining a supply of available iron to crops growing on iron-deficient soils.

SUMMARY OF THE INVENTION

It has now been discovered that significant improvements have been made to the invention of Mortvedt, supra. These improvements include 1) the addition of citric acid (or other similar organic acids within the same chemical family, known as "hydroxy acids", such as lactic acid, malic acid, or tartaric acid, etc.) to the hydrophilic polymer delivery systems of Mortvedt, supra, to significantly and greatly increase the efficacy of said delivery system in alleviating iron deficiency-induced chlorosis in plants grown on calcareous, high pH soil; 2) formulating the polymer delivery materials of Mortvedt, supra, to include citric acid or other organic acid of the same chemical family, thereafter drying and crushing the resulting material to a relatively uniform particle size to significantly and greatly facilitate ease of packaging, handling and application to soil, whether in band or spot application, with significant increase in efficiency in alleviating iron chlorosis in plants; accordingly, the application of this material in relatively narrow continuous bands, on the order of about ¼ to ¾ inches in diameter, along or parallel to the seed row or spot placed in the root zone of living plants is normally the easiest and most convenient manner of distribution; and 3) cellulose ethers, plant-derived guar gums, and propenoate-propenamides, which are all different chemical classes of hydrophilic polymers, and which were previously shown by Mortvedt, supra, to be mediocre for use in hydrophilic polymer delivery systems, may now be used with as good and essentially equal effectiveness as the more costly polyacrylamide or polyacrylamide-polyacrylate polymers as carriers of iron in DGP formulations.

It would appear that the principal mechanisms which are responsible for preserving, for a substantial period of time, these iron source materials in formulations of DGP in a form which ultimately is readily available to growing plants is one of isolation by chemical means of complexing with citric acid, and by physical means afforded by the hydrated gel matrix, of such iron source materials from the deleterious effects of or combinations with soil components, including aqueous media, at or near the application situs. In addition, it has now been discovered that the most preferred methods of application of such citric acid-containing DGP, namely, subsurface band application to soil at or prior to planting or spot application in the root zone of growing plants in soil, will result in the formation of a hydrated continuous gel band when exposed to moisture in the soil, thus isolating such materials from reacting with the soil to form compounds which are unavailable to plants. Furthermore, observation of citric acid-containing DGP in situ in soil revealed the formation of a diffusion zone of iron from the gel band into the surrounding soil, such iron being in forms protected from soil reactions, which thus substantially increased plant utilization of the iron contained in the formulations over the same products which do not contain citric acid.

Results of greenhouse investigations indicated that these dried formulations of iron sources, citric acid, and hydrophilic polymer combinations are effective for use on a variety of iron-sensitive crops growing in iron-deficient soils. It has also been discovered that they may be band applied near the seed row at planting. In addition, it is proposed that they may be used as specialty fertilizers to other crops, providing they are spot placed in the root zone or what will be the root zone in the soil rather than on or juxtaposed the soil surface. These combinations may be especially beneficial for certain slower growing perennial crops such as fruit trees, grape vines, and shrubs because biodegradation of the mixture buried within soil occurs slowly over a long period of time. Iron in the formulations is thus protected from reactions with soil and maintained in a form available to these plants during periods of active growth and of active iron uptake as well as during slower growth periods when demand for iron is low. These combinations may also be especially beneficial to lower-cash value row crops such as grain sorghum, corn, and soybeans since the product is less costly to produce and use than alternative methods of iron fertilization and also provides for sustained iron availability for such field crops during an entire growing season, or longer. One DGP produced according to the practice of the instant invention recently has been field tested for corn growing on high pH, calcareous soil in Nebraska, where iron deficiencies typically occur. Photographic documentation of plant vigor and growth substantiated the effectiveness of the DGP as a superior iron source for the plants during early growth stages, throughout the season until crop maturity, and for a subsequent corn crop planted one year later. Further elaboration of this test is given within the Examples, infra.

Investigations into the utilization of iron in the DGP revealed that band application established veins of the DGP in the immediate vicinity anticipated for plant root development. These bands of dry material subsequently were hydrated by moisture in the soil to form continuous, intact gel bands, in exactly the same physical form as the fluid gels of Mortvedt, supra. After sufficient time had elapsed for such development, cross sectioning of such veins and observing the soil matrix surrounding same clearly showed an unusual propensity of root and root hair growth in the product region in preference to the surrounding soil matrix. In addition, the development of an orange-colored zone or "halo" in the soil around the product was suggestive of iron transport in soluble form away from the gel band, thereby increasing the volume of iron-enriched soil available for root exploration with resultant significantly increased efficiency of iron uptake by the plant. This clearly established that the instant new and novel delivery system focuses plant root development in a fashion whereby contact with and uptake of iron in such veined regions is not only substantially enhanced but is, indeed, totally optimized.

Another aspect of the instant invention relates to a method of enhancing the yield and/or growth of plants by distributing the composition of this invention in the "plant growth media" in which the plants are being grown within reach of the root system of the plants (hereinafter referred to as "root zone"). As used herein, the term "plant growth media" refers to various natural and artificial media which support plant growth, including but not limited to soil, potting mixtures of organic and inorganic matter, and artificial media such as vermiculite or polyurethane foam.

Yet another aspect of the present invention relates to a method for inhibiting the degradation of certain water-soluble iron source micronutrient materials, principally iron sulfates, including ferric sulfate or ferrous sulfate or both, when said iron source micronutrients are applied to such plant growth media, which aspect comprises providing an effective isolation said water-soluble iron source micronutrients from said plant growth media such that same do not react with components therein in a fashion whereby the iron sulfates form water-insoluble or substantially water-insoluble compounds, which water-insoluble compounds are or become unavailable to plant growth sought to be treated with such iron source micronutrients. A principal embodiment of this invention, which provides such effective isolation is the homogeneous mixing and resultant chemical interaction between the polymer, citric acid and iron sources in the DGP from which arises complexation and protection of iron sulfates from soil reactions by citric acid, and physical isolation and containment of iron by the gel matrix from soil reactions which would otherwise render iron unavailable to plants. Practice of the instant invention ensures that iron sulfates so processed remain substantially water-soluble in the resulting formed mixture.

As used herein, the term "effective isolation" refers to the protective mechanism of isolation and containment by a gel matrix and complexation of the iron sulfates, supra, in an intimate mixture formed with citric acid or other such organic acid and iron sulfate that encompasses an isolation or separation so effective that all or most of the so-treated iron sulfates remain substantially water-soluble for at least a period of about 2 weeks and preferably a period ranging from at least about 4 to about 6 weeks, more preferably at least about 120 days, and most preferably for a period of time ranging upwards to 1 year, or more.

As used herein, the terms "dried iron-gel particles," "dried gel particles," or more simply, "DGP" refer to the product resulting from mixing of predetermined amounts of iron source, effective amounts of citric acid or other similar organic acid and a hydrophilic polymer into a fluid gel which is then dried and crushed into appropriately sized particles for ease of application. The effective amount of citric acid for use in the DGP formulations was calculated mathematically by use of a procedure known in the trade as "mole fraction calculations," which calculations determine the concentration of a ligand (citric acid) that will complex with a given concentration of metal (iron), or vice-versa, up to a maximum amount where equilibria between the two is reached and no further complexation will occur. As an example, given a 5 percent solution of iron sulfate, containing 1 percent iron, the effective concentration of citric acid was mathematically determined to be 10 percent.

As used herein, the term "substantially water-soluble" encompasses materials which are initially water-soluble such as ferric sulfate or materials which have only degraded, by reaction with components in growth media to the point that the resulting reaction products in combination with the unreacted materials, in the aggregate, provide a material which is at least about 60 percent water-soluble.

As used herein, the term "root zone" refers to that area in the plant growth media within the reach of the root system of a particular desired plant or crop and in the field normally comprises that portion of the soil matrix generally beneath the seed planting band and areas juxtaposed thereto, generally parallel with the band and protruding downwardly from a few inches to perhaps about a foot. In the practice of the invention there will oftentimes be provided veins or islands of iron-enriched DGP through such root zone in a fashion such that any plant roots entering therein will be provided with an environment enhanced both mechanically and nutritionally by virtue of the uniformity of consistency of said mixture which is considerably more easily penetrated and expanded into than is a normal soil matrix and which by virtue of the ease of wetting of the mixture for the roots growing therein, as well as the abundant supply of desirable iron within the mixture and in an iron rich diffusion zone immediately outside the mixture and extending perhaps 4 up to 7 centimeters into the soil away from the mixture band, provides a micro-environment wherein root growth is substantially enhanced.

As used herein, the term "enhanced root growth region" refers to such plant growth media discontinuities comprising iron-enriched DGP mixtures and the associated diffusion zone of the type herein contemplated and referenced.

As used herein and applied to the resulting dried hydrogel, the term "friable" refers to a physical characteristic whereby the normally resilient or tacky hydrogel has sufficient water removed therefrom to convert it into a relatively hard, brittle friable material, whereby ordinary crushing means and methods including roller crushers or the like are easily comminuted.

Still yet another aspect of the instant invention relates to the ease of application to soil. The physical properties (dry, granular, and free-flowing) of the DGP product render it eminently more suitable for state of the art variable rate technology in modern agricultural applicator equipment, which enables soil application rates to be made selectively, precisely, and accurately, and thus, economically, to predetermined areas, and only to those areas, if so desired, within a field. Thus, crop yields may be obtained in areas, such as, for example, high pH, calcareous regions within a field which previously had no history of gainful yields.

OBJECTS OF THE INVENTION

It is therefore a principal object of the present invention to provide a new and improved combination of materials which are eminently suitable for supplying iron to soil systems and/or to the situs of growing plants for substantial periods of time of at least about 28 days, preferably of at least about 60 days, and most preferably of at least about 120 days or longer, and in a form such that they can readily be absorbed by the roots of such growing plants.

Another principal object of the present invention is to provide a new and improved method, as well as a new combination of materials eminently suitable for supplying iron to soil systems and/or to the situs of growing plants for substantial periods of time and in a form such that, although such materials most preferably may be band applied near the seed row in soil or spot placed directly in the root zone of growing plants, they will be readily available for absorption by the roots of such growing plants.

Still another principal object of the present invention is to provide a new and improved method, as well as an improved combination of materials eminently suitable for soil applications and for supplying iron to soil systems and/or to the situs of growing plants in a form such that will be absorbed by the roots of such growing plants and wherein such materials comprise either separate components or admixtures of components including hydrophilic polymers of various chemical classes, certain organic acids, particularly citric acid, and iron source materials, said iron source materials including ferrous and ferric sulfate.

A further principal object of the present invention is to provide a new and improved method, as well as a new combination of materials eminently suitable for supplying iron to soil systems and/or to the situs of growing plants to act as a most efficient delivery system for such iron, and for uptake by growing plants in a manner wherein upon contact and penetration of said DGP, the plant roots evidence an unusual propensity for further growth thereinto, and into a defined diffusion zone of a plant nutrient, whereby the uptake of iron values are more effectively utilized than if iron were homogeneously mixed in the surrounding soil matrix.

Still a further principal object of the present invention in a principal embodiment thereof is to provide new procedures to effect the mixing of certain gel-forming polymers with aqueous citric acid-containing and aqueous iron-containing solutions to result in the formation of gels which can be dried and subsequently be broken into particles which can be more easily applied to soil situses than fluid gels to provide thereat sufficient available iron as may be required by growing plants.

Still further and more general objects and advantages of the present invention will appear from the more detailed description set forth in the following disclosure and examples, it being understood, however, that this more detailed description is given by way of illustration and explanation only and not necessarily by way of limitation, since various changes therein may be made by those skilled in the art without departing from the true spirit and scope of the gist underlying the present invention.

DESCRIPTION OF THE PREFERRED EMBODIMENTS

The present invention is directed to methods of mixing, as well as the specific compositions utilized therein for applying to a designated soil situs, various combinations of hydrophilic polymer, citric acid, and selected water-soluble compounds of iron including, in the most preferred embodiments, ferrous sulfate, or ferric sulfate. Practice of the instant invention results in the formation of new compounds for improved fertilizers having incorporated therein water-soluble compounds of iron in forms wherein same are sufficiently isolated, both chemically and physically, at least temporarily, from contact with soil media but are juxtaposed such media such that the iron values therein remain available to maintain the prerequisite supply of iron in a form readily useful to plants growing at or near such situs.

The combinations of hydrophilic polymer, citric acid, and iron sulfate were analyzed with a Nicolet 60SX Fourier transformed infrared spectroscopy (FTIR) system before hydration with deionized water, and after hydration and drying, to confirm the formation of new compounds. Each sample material was pelletized with KBr for analysis; the spectrum from a KBr pellet, used as a background blank, was subtracted from each initial sample spectrum.

Referring now generally to Table I-a through Table V-b, there are shown by peak number (for convenience) the infrared spectral peak positions, intensities, and relative intensities for various individual composite mixtures of a hydrophilic polymer, citric acid, and iron sulfate. A table designated with the letter "a" shows the infrared absorption data for a given mixture before hydration and drying; the counterpart table designated with the letter "b" shows the data for the mixture after hydration and drying, i.e., the dried gel, or DGP. The peaks that were present in the spectra, and which are designated by peak number and peak position in Table I-a through Table V-b, represent the frequencies of vibrational bending and stretching that occurred within the molecules of the compounds due to the absorbance of light energy. Shifts in such vibrational frequencies in the region where light was absorbed (due to peak splitting, additions or deletions, or a change in the relative intensity of an existing peak) were indicative of changes in chemical bonding within the mixtures after hydration and drying. Such changes in bonding consistently occurred, regardless of the polymer type, and thus resulted in the formation of new compounds which were notably, if not entirely, different from those present in the original, unhydrated mixtures. For example, an unhydrated mixture containing a polyacrylamide polymer, iron sulfate, and citric acid was spectrally similar to an analogous mixture containing a polyacrylate due to the close similarities in the chain backbone structure. Although each mixture shared many of the same spectral traits after hydration and drying, each also exhibited such changes as to be not only different from each other, but also different in form from the original mixture.

Referring now specifically to Table I-a and Table I-b, therein are shown the infrared data for a mixture of a polyacrylamide polymer, citric acid, and iron sulfate, said mixture either unhydrated or previously hydrated and then dried. Significant differences are noted between the absorption spectra for the unhydrated mixture (Table I-a) and for the hydrated and dried mixture (Table I-b). Twenty absorption peaks were identified in the unhydrated mixture versus 29 peaks in the dried gel. There were 10 absorption peaks common to both spectra (peak matches). Splitting and/or addition of peaks occurred with the dried gel in the regions 2600–4000, 1500–2000, and 650–1500 $cm^{-1}$. Changes in the relative intensity and magnitude of peaks common to both spectra were also apparent. The major changes in the region 2600–4000 $cm^{-1}$ were the splitting of peak number 1 (Table 1-a) into two peaks occurring at wavenumbers 3481 and 3400 (peak numbers 1 and 2, Table 1-b) and the addition of peak numbers 3 and 5 (Table 1-b). Peak number 6 (Table 1-b) did not occur in the unhydrated mixture. Three additional peaks occurred in the region 1500–2000 $cm^{-1}$ with the hydrated and dried gel mixture (peak numbers 9, 10, and 11, Table 1-b). Eight additional peaks occurred in the region 650–1500 $cm^{-1}$ with the hydrated mixture (peak numbers 12, 14, 15, 16, 18, 19, 21, and 25, Table 1-b). There was no discernible pattern to changes in magnitude and relative intensity of the seven peaks in this region common to both the unhydrated mixture and the hydrated and dried mixture.

TABLE I-a

Infrared Absorption Bands Frequency ($cm^{-1}$) for a Composite Mixture of DGP (Iron Sulfate, a Polyacrylamide Polymer, and Citric Acid) Before Hydration and Drying

| Peak No. | Peak Position | Peak Intensity | Relative Intensity |
|---|---|---|---|
| 1 | 3429 | S–B | 8 |
| 2 | 3275 | Sh | 7 |
| 3 | 3018 | Sh | 6 |
| *4 | 2625 | W–B | 3 |
| 5 | 2565 | Sh | 3 |
| 6 | 1981 | VW–B | 1 |
| *7 | 1726 | S–Sp | 9 |
| 8 | 1628 | M–Sp | 4 |
| *9 | 1398 | M–Sp | 4 |
| 10 | 1338 | W–B | 3 |
| *11 | 1221 | MS–Sp | 6 |
| 12 | 1134 | Sh | 5 |
| *13 | 1115 | M–Sp | 5 |
| 14 | 1088 | Sh | 4 |
| *15 | 987 | VW–Sp | 2 |
| *16 | 937 | VW–Sp | 2 |
| *17 | 897 | VW–Sp | 2 |
| *18 | 791 | W–Sp | 2 |
| *19 | 606 | M–Sp | 4 |
| 20 | 507 | Sh | 4 |

Sh = shoulder; B = broad; Sp = sharp; S = strong; MS = medium strong; M = medium; W = weak; VW = very weak. Relative intensities are on a scale of 1 to 10.
*Peaks that occurred in mixtures both before and after hydration are indicated with an asterisk.

TABLE I-b

Infrared Absorption Bands Frequency ($cm^{-1}$) for a Composite Mixture of DGP (Iron Sulfate, a Polyacrylamide Polymer, and Citric Acid) After Hydration and Drying

| Peak No. | Peak Position | Peak Intensity | Relative Intensity |
|---|---|---|---|
| 1 | 3481 | MS–Sp | 4 |
| 2 | 3400 | MS–Sp | 4 |
| 3 | 3215 | MS–B | 4 |
| 4 | 2937 | Sh | 3 |
| 5 | 2700 | Sh | 2 |
| *6 | 2621 | W–B | 2 |

TABLE I-b-continued

Infrared Absorption Bands Frequency ($cm^{-1}$) for a Composite Mixture of DGP (Iron Sulfate, a Polyacrylamide Polymer, and Citric Acid) After Hydration and Drying

| Peak No. | Peak Position | Peak Intensity | Relative Intensity |
|---|---|---|---|
| 7 | 2540 | W–B | 2 |
| *8 | 1730 | S–Sp | 5 |
| 9 | 1659 | Ms–Sp | 4 |
| 10 | 1610 | S–Sp | 4 |
| 11 | 1566 | Sh | 4 |
| 12 | 1419 | Ms–Sp | 4 |
| *13 | 1396 | S–Sp | 4 |
| 14 | 1377 | Sh | 4 |
| 15 | 1325 | MS–Sp | 3 |
| 16 | 1286 | Ms–Sp | 3 |
| *17 | 1225 | Ms–Sp | 4 |
| 18 | 1194 | MS–Sp | 4 |
| 19 | 1142 | S–Sp | 4 |
| *20 | 1109 | S–Sp | 4 |
| 21 | 1074 | MS–Sp | 4 |
| *22 | 978 | Sh | 3 |
| *23 | 937 | W–Sp | 2 |
| *24 | 891 | M–Sp | 3 |
| 25 | 850 | M–Sp | 3 |
| *26 | 795 | M–Sp | 3 |
| *27 | 613 | Ms–Sp | 4 |
| 28 | 580 | Ms–Sp | 4 |
| 29 | 540 | Sh | 4 |

Sh = shoulder; B = broad; Sp = sharp; S = strong; MS = medium strong; M = medium; W = weak; VW = very weak. Relative intensities are on a scale of 1 to 10.
*Peaks that occurred in mixtures both before and after hydration are indicated with an asterisk.

Referring now specifically to Table II-a and Table II-b, therein are shown the infrared data for a mixture of a guar gum polymer, citric acid, and iron sulfate, either unhydrated or previously hydrated and dried. Significant differences are noted between the absorption spectra for the unhydrated mixture (Table II-a) and for the hydrated and dried mixture (Table II-b). Thirty-six absorption peaks were identified in the unhydrated mixture versus 20 peaks in the dried gel. There were eight absorption peaks common to both spectra (peak matches). The major changes noted in the spectrum for the dried gel were the loss of four peaks in the region 2600–4000 $cm^{-1}$, the loss of one peak in the region 1500–2000 $cm^{-1}$, and the loss of twelve peaks in the region 500–1500 $cm^{-1}$. There were also minor changes in the intensity and magnitude of peaks common to both spectra.

TABLE II-a

Infrared Absorption Bands Frequency ($cm^{-1}$) for a Composite Mixture of DGP (Iron Sulfate, a Guar Gum Polymer, and Citric Acid) Before Hydration and Drying

| Peak No. | Peak Position | Peak Intensity | Relative Intensity |
|---|---|---|---|
| 1 | 3495 | S–Sp | 8 |
| 2 | 3454 | S–Sp | 7 |
| 3 | 3383 | S–Sp | 6 |
| 4 | 3292 | S–Sp | 3 |
| *5 | 2943 | Sh | 3 |
| 6 | 2640 | W–B | 1 |
| 7 | 2563 | VW–B | 9 |
| *8 | 1998 | VW–B | 4 |
| 9 | 1743 | S–Sp | 4 |
| 10 | 1714 | S–Sp | 3 |
| *11 | 1626 | W–Sp | 6 |

TABLE II-a-continued

Infrared Absorption Bands Frequency (cm$^{-1}$) for a Composite Mixture of DGP (Iron Sulfate, a Guar Gum Polymer, and Citric Acid) Before Hydration and Drying

| Peak No. | Peak Position | Peak Intensity | Relative Intensity |
|---|---|---|---|
| 12 | 1416 | W–Sp | 5 |
| 13 | 1392 | M–Sp | 5 |
| 14 | 1360 | W–Sp | 4 |
| 15 | 1340 | W–Sp | 2 |
| 16 | 1321 | W–Sp | 2 |
| 17 | 1308 | W–Sp | 2 |
| 18 | 1292 | W–Sp | 2 |
| 19 | 1240 | M–Sp | 4 |
| 20 | 1217 | MS–Sp | 5 |
| 21 | 1198 | Ms–Sp | 4 |
| 22 | 1176 | Ms–Sp | 5 |
| 23 | 1144 | Ms–Sp | 5 |
| 24 | 1113 | Ms–Sp | 5 |
| *25 | 1082 | Ms–Sp | 4 |
| 26 | 989 | Sh | 2 |
| *27 | 941 | VW–Sp | 2 |
| *28 | 904 | VW–Sp | 1 |
| *29 | 881 | VW–Sp | 1 |
| 30 | 818 | VW–Sp | 2 |
| 31 | 783 | W–Sp | 2 |
| 32 | 685 | Sh | 2 |
| 33 | 638 | Sh | 3 |
| *34 | 600 | M–Sp | 3 |
| 35 | 546 | W–Sp | 3 |
| 36 | 498 | W–Sp | 3 |

Sh = shoulder; B = broad; Sp = sharp; S = strong; MS = medium strong; M = medium; W = weak; VW = very weak. Relative intensities are on a scale of 1 to 10.
*Peaks that occurred in mixtures both before and after hydration are indicated with an asterisk.

TABLE II-b

Infrared Absorption Bands Frequency (cm$^{-1}$) for a Composite Mixture of DGP (Iron Sulfate, a Guar Gum Polymer, and Citric Acid) After Hydration and Drying

| Peak No. | Peak Position | Peak Intensity | Relative Intensity |
|---|---|---|---|
| 1 | 3388 | S–B | 8 |
| *2 | 2941 | Sh | 5 |
| 3 | 2629 | W–B | 2 |
| *4 | 1992 | VW–B | 1 |
| 5 | 1732 | S–Sp | 8 |
| *6 | 1633 | W–Sp | 2 |
| 7 | 1400 | M–Sp | 4 |
| 8 | 1194 | S–Sp | 7 |
| 9 | 1138 | Ms–Sp | 6 |
| *10 | 1082 | MS–Sp | 6 |
| 11 | 1018 | Sh | 4 |
| 12 | 976 | Sh | 2 |
| *13 | 941 | Sh | 2 |
| *14 | 897 | VW–Sp | 2 |
| *15 | 874 | VW–Sp | 2 |
| 16 | 812 | W–Sp | 3 |
| 17 | 665 | W–Sp | 2 |
| 18 | 623 | W–Sp | 3 |
| *18 | 602 | W–Sp | 3 |
| 19 | 525 | W–Sp | 3 |

Sh = shoulder; B = broad; Sp = sharp; S = strong; MS = medium strong; M = medium; W = weak; VW = very weak. Relative intensities are on a scale of 1 to 10.
*Peaks that occurred in mixtures both before and after hydration are indicated with an asterisk.

Referring now to Table III-a and Table III-b, therein are shown the infrared data for a mixture of a polyacrylate polymer, citric acid, and iron sulfate, either unhydrated or previously hydrated and dried. Significant differences are noted between the absorption spectra for the unhydrated mixture (Table III-a) and for the hydrated and dried mixture (Table III-b). Eighteen absorption peaks were identified in the unhydrated mixture versus 35 peaks in the dried gel. There were 12 absorption peaks common to both spectra (peak matches). Splitting and/or addition of peaks occurred with the dried gel in the regions 2600–4000, 1500–2000, and 1000–1500 cm$^{-1}$. The majority of splitting and/or additions occurred in the region 1000–1500 cm$^{-1}$. The only clear increases in relative intensity of peaks common to both spectra occurred at peak numbers 9, 21, and 22 (Table III-b) with the hydrated and dried gel mixture.

TABLE III-a

Infrared Absorption Bands Frequency (cm$^{-1}$) for a Composite Mixture of DGP (Iron Sulfate, a Polyacrylate Polymer, and Citric Acid) Before Hydration and Drying

| Peak No. | Peak Position | Peak Intensity | Relative Intensity |
|---|---|---|---|
| 1 | 3429 | S–B | 8 |
| 2 | 3250 | Sh | 7 |
| 3 | 2953 | Sh | 5 |
| *4 | 2600 | W–B | 3 |
| *5 | 1986 | VW–B | 1 |
| *6 | 1728 | S–Sp | 8 |
| *7 | 1630 | M–Sp | 4 |
| 8 | 1514 | Sh | 1 |
| *9 | 1400 | W–Sp | 4 |
| 10 | 1350 | Sh | 3 |
| *11 | 1221 | M–Sp | 5 |
| *12 | 1144 | M–Sp | 4 |
| *13 | 1105 | M–Sp | 4 |
| *14 | 982 | VW–Sp | 2 |
| *15 | 937 | VW–Sp | 2 |
| *16 | 893 | VW–Sp | 2 |
| *17 | 793 | VW–Sp | 2 |
| 18 | 609 | W–Sp | 4 |

Sh = shoulder; B = broad; Sp = sharp; S = strong; MS = medium strong; M = medium; W = weak; VW = very weak. Relative intensities are on a scale of 1 to 10.
*Peaks that occurred in mixtures both before and after hydration are indicated with an asterisk.

TABLE III-b

Infrared Absorption Bands Frequency (cm$^{-1}$) for a Composite Mixture of DGP (Iron Sulfate, a Polyacrylate Polymer, and Citric Acid) After Hydration and Drying

| Peak No. | Peak Position | Peak Intensity | Relative Intensity |
|---|---|---|---|
| 1 | 3479 | MS–Sp | 7 |
| 2 | 3398 | S–Sp | 8 |
| 3 | 3242 | Sh | 6 |
| 4 | 2976 | Sh | 5 |
| *5 | 2619 | W–Bp | 3 |
| 6 | 2542 | Sh | 3 |
| *7 | 1981 | Vw–B | 1 |
| *8 | 1728 | S–Sp | 9 |
| *9 | 1610 | M–Sp | 6 |
| 10 | 1564 | W–Sp | 4 |
| 11 | 1554 | W–Sp | 4 |
| 12 | 1502 | Sh | 2 |
| 13 | 1479 | Sh | 2 |
| 14 | 1419 | M–Sp | 5 |
| *15 | 1396 | M–Sp | 5 |
| 16 | 1375 | Sh | 4 |
| 17 | 1325 | W–Sp | 4 |
| 18 | 1286 | M–Sp | 4 |
| *19 | 1230 | M–Sp | 5 |
| 20 | 1194 | M–Sp | 5 |
| *21 | 1144 | M–Sp | 6 |
| *22 | 1103 | M–Sp | 6 |

TABLE III-b-continued

Infrared Absorption Bands Frequency (cm⁻¹) for a Composite Mixture of DGP (Iron Sulfate, a Polyacrylate Polymer, and Citric Acid) After Hydration and Drying

| Peak No. | Peak Position | Peak Intensity | Relative Intensity |
|---|---|---|---|
| 23 | 1072 | M–Sp | 4 |
| *24 | 982 | VW–Sp | 2 |
| *25 | 939 | VW–Sp | 2 |
| *26 | 893 | VW–Sp | 2 |
| *27 | 876 | Sh | 2 |
| 28 | 850 | VW–Sp | 2 |
| 29 | 795 | W–Sp | 3 |
| 30 | 700 | Sh | 3 |
| 31 | 669 | Sh | 3 |
| 32 | 617 | W–Sp | 4 |
| 33 | 580 | W–Sp | 4 |
| 34 | 563 | Sh | 4 |
| 35 | 540 | W–Sp | 4 |

Sh = shoulder; B = broad; Sp = sharp; S = strong; MS = medium strong; M = medium; W = weak; VW = very weak. Relative intensities are on a scale of 1 to 10.
*Peaks that occurred in mixtures both before and after hydration are indicated with an asterisk.

Referring now to Table IV-a and Table IV-b, therein are shown the infrared data for a mixture of a cellulose ether polymer, citric acid, and iron sulfate, either unhydrated or previously hydrated and dried. Slight, but significant differences are noted between the absorption spectra for the unhydrated mixture (Table IV-a) and for the hydrated and dried mixture (Table IV-b). Seventeen absorption peaks were identified in the unhydrated mixture and in the dried gel. There were 14 absorption peaks common to both spectra (peak matches). A clear increase in the relative intensity/resolution of peaks 7, 8, 10, 11, and 12, and a significant shift in wavenumber location of peaks 10 and 11 were the major distinguishing differences noted in the spectrum of the dried gel material.

TABLE IV-a

Infrared Absorption Bands Frequency (cm⁻¹) for a Composite Mixture of DGP (Iron Sulfate, a Cellulose Ether, Polymer, and Citric Acid) Before Hydration and Drying

| Peak No. | Peak Position | Peak Intensity | Relative Intensity |
|---|---|---|---|
| *1 | 3417 | S–B | 6 |
| *2 | 2941 | Sh | 4 |
| *3 | 2627 | W–B | 2 |
| *4 | 2023 | VW–B | 1 |
| *5 | 1728 | S–Sp | 5 |
| *6 | 1632 | W–Sp | 2 |
| *7 | 1385 | M–Sp | 3 |
| *8 | 1358 | Sh | 2 |
| 9 | 1327 | Sh | 2 |
| 10 | 1225 | M–Sp | 3 |
| 11 | 1113 | M–Sp | 3 |
| 12 | 1061 | M–Sp | 3 |
| *13 | 937 | VW–Sp | 1 |
| *14 | 887 | VW–Sp | 1 |
| *15 | 791 | VW–Sp | 1 |
| *16 | 598 | W–Sp | 2 |
| 17 | 503 | Sh | 2 |

Sh = shoulder; B = broad; Sp = sharp; S = strong; MS = medium strong; M = medium; W = weak; VW = very weak. Relative intensities are on a scale of 1 to 10.
*Peaks that occurred in mixtures both before and after hydration are indicated with an asterisk.

TABLE IV-b

Infrared Absorption Bands Frequency (cm⁻¹) for a Composite Mixture of DGP (Iron Sulfate, a Cellulose Ether, Polymer, and Citric Acid) After Hydration and Drying

| Peak No. | Peak Position | Peak Intensity | Relative Intensity |
|---|---|---|---|
| *1 | 3423 | S–B | 7 |
| *2 | 2941 | M–B | 4 |
| *3 | 2621 | VW–B | 2 |
| *4 | 2010 | VW–B | 1 |
| *5 | 1728 | S–Sp | 7 |
| *6 | 1632 | W–Sp | 3 |
| *7 | 1390 | W–Sp | 3 |
| *8 | 1350 | W–Sp | 3 |
| 9 | 1298 | W–Sp | 3 |
| 10 | 1205 | MS–Sp | 6 |
| 11 | 1126 | MS–Sp | 5 |
| 12 | 1078 | MS–Sp | 5 |
| *13 | 945 | Sh | 2 |
| *14 | 883 | VW–B | 1 |
| *15 | 796 | W–B | 2 |
| *16 | 602 | M–Sp | 3 |
| 17 | 523 | Sh | 3 |

Sh = shoulder; B = broad; Sp = sharp; S = strong; MS = medium strong; M = medium; W = weak; VW = very weak. Relative intensities are on a scale of 1 to 10.
*Peaks that occurred in mixtures both before and after hydration are indicated with an asterisk.

Referring now to Table V-a and Table V-b, therein are shown the infrared data for a mixture of a propenoate-propenamide polymer, citric acid, and iron sulfate, either unhydrated or previously hydrated and dried. Slight, but significant differences are noted between the absorption spectra for the unhydrated mixture (Table V-a) and for the hydrated and dried mixture (Table V-b). Fifteen absorption peaks were identified in the unhydrated mixture versus 19 peaks in the dried gel. There were 12 absorption peaks common to both spectra (peak matches). An obvious increase in the relative intensity/resolution of peak numbers 8 and 19 of the dried gel (corresponding to peak numbers 7 and 16, respectively, of the unhydrated material) and the splitting of peak number 11 in Table V-a into two sharply resolved peaks (numbers 12 and 13) in Table V-b were the major differences noted in the spectrum of the dried gel material.

TABLE V-a

Infrared Absorption Bands Frequency (cm⁻¹) for a Composite Mixture of DGP (Iron Sulfate, a Propenoate-Propenamide Polymer, and Citric Acid) Before Hydration and Drying

| Peak No. | Peak Position | Peak Intensity | Relative Intensity |
|---|---|---|---|
| *1 | 3450 | S–B | 7 |
| 2 | 2935 | Sh | 4 |
| *3 | 2619 | Sh | 3 |
| *4 | 2087 | Sh | 2 |
| *5 | 1726 | M–Sp | 4 |
| 6 | 1637 | M–B | 3 |
| *7 | 1400 | VW–Sp | 2 |
| *8 | 1385 | VW–Sp | 2 |
| *9 | 1344 | Sh | 2 |
| *10 | 1227 | W–Sp | 2 |
|  | 1122 | W–Sp | 2 |
| *11 | 982 | VW–Sp | 1 |
| *12 | 937 | Vw–Sp | 1 |
| *13 | 887 | Sh | 1 |

TABLE V-a-continued

Infrared Absorption Bands Frequency (cm$^{-1}$) for a Composite Mixture of DGP (Iron Sulfate, a Propenoate-Propenamide Polymer, and Citric Acid) Before Hydration and Drying

| Peak No. | Peak Position | Peak Intensity | Relative Intensity |
|---|---|---|---|
| *14 | 791 | Sh | 1 |
| *15 | 619 | W–Sp | 2 |

Sh = shoulder; B = broad; Sp = sharp; S = strong; MS = medium strong; M = medium; W = weak; VW = very weak. Relative intensities are on a scale of 1 to 10.
*Peaks that occurred in mixtures both before and after hydration are indicated with an asterisk.

TABLE V-b

Infrared Absorption Bands Frequency (cm$^{-1}$) for a Composite Mixture of DGP (Iron Sulfate, a Propenoate-Propenamide Polymer, and Citric Acid) After Hydration and Drying

| Peak No. | Peak Position | Peak Intensity | Relative Intensity |
|---|---|---|---|
| *1 | 3454 | S–B | 6 |
| 2 | 3225 | Sh | 5 |
| *3 | 2949 | Sh | 3 |
| *4 | 2640 | Sh | 2 |
| *5 | 2077 | Sh | 1 |
| *6 | 1722 | Ms–Sp | 4 |
| 7 | 1660 | M–Sp | 3 |
| *8 | 1398 | W–Sp | 2 |
| *9 | 1387 | Sh | 2 |
| *10 | 1331 | Sh | 1 |
| *11 | 1227 | W–Sp | 2 |
| 12 | 1130 | W–Sp | 2 |
| 13 | 1115 | W–Sp | 2 |
| *14 | 982 | VW–Sp | 0 |
| *15 | 937 | VW–Sp | 0 |
| *16 | 897 | Sh | 0 |
| 17 | 850 | Sh | 0 |
| *18 | 793 | Sh | 1 |
| *19 | 619 | W–Sp | 2 |

Sh = shoulder; B = broad; Sp = sharp; S = strong; MS = medium strong; M = medium; W = weak; VW = very weak. Relative intensities are on a scale of 1 to 10.
*Peaks that occurred in mixtures both before and after hydration are indicated with an asterisk.

From the discussion of the infrared absorption data, supra, it should now be abundantly clear that changes occurred in the polymer-citric acid-iron sulfate mixtures after hydration and drying which resulted in the formation of compounds not present in the original mixture, and that these compounds represent new compositions of matter.

EXAMPLES

In order that those skilled in the art may better understand how the present invention can be practiced, the following examples are given by way of illustration only and not necessarily by way of limitation, since numerous variations thereof will occur and will undoubtedly be made by those skilled in the art without substantially departing from the true and intended scope and spirit of the instant invention herein taught and disclosed.

Greenhouse pot experiments were conducted to determine availability of iron from various commercially available iron sources and DGP, said DGP mixture being formulated with different chemical classes of polymers, with each iron source or DGP mixture being applied in a band (¼ to ¾ inch in diameter and 4 to 6 inches long at a depth of 2 inches below the soil surface and 1 inch away from the seed row to a calcareous iron-deficient soil at an application rate ranging between about 10 and about 40 pounds of iron per acre. For comparison purposes, each iron fertilizer, namely, iron (ferrous or ferric) sulfate and FeEDDHA was band applied by itself at the same soil depth and distance from the seed row. In addition, a polyacrylamide polymer formulation of DGP was field-tested to determine the effectiveness of the DGP for the iron nutrition of corn growing under actual field conditions.

In the following three examples, unless otherwise indicated, all parts and percentage compositions are by weight. In the greenhouse studies, each pot was 6 inches in diameter and was charged with about 1 kilogram of Epping silt loam soil. The soil in all greenhouse pots was fertilized uniformly with all known plant nutrients except iron at rates known to provide optimum plant response, so that any crop responses could be attributed to iron contained in the various materials, including the DGP mixtures, or iron source materials or FeEDDHA or hydrophilic polymer-iron source materials applied as comparisons to the DGP mixture. See Konrad Mengel, and E. A. Kirkby, *Principles of Plant Nutrition*, International Potash Institute, Bern, Switzerland (1982), herein incorporated by reference thereto, for an example of the variety and concentrations of micronutrients used to satisfy such requirements. The test crop for the greenhouse experiments was grain sorghum (*Sorghum bicolor* L. Moench), cultivar RS-626, a variety known to be susceptible to iron chlorosis when grown on iron-deficient soils such as the Epping silt loam type herein used. Three replicates of each treatment were used in a completely randomized design. Deionized water was used during the entire growth period and forage was harvested after 6 weeks' growth. The soil in greenhouse pots was sliced longitudinally post-harvest to examine fertilizer band characteristics. In the field study, the DGP were tested as an iron source for corn (*Zea mays* L.) in a factorial design against other iron source materials using four replications plus an untreated check on high pH Cozad silt loam soil in the State of Nebraska.

The resulting DGP mixtures, containing a proper diet of required iron, have now been found to act to more effectively deliver to the plants treated therewith the nutrient contained therein. It is believed that these products act to focus the beneficial effects of such therein contained iron due to the fact that proper placement thereof at the soil situs juxtaposed the plant root both provide a protective matrix for iron contained therein and effectively causes or enhances root development and growth to and throughout the regions of soil displaced by "islands" or "veins" of such mixtures while at the same time supplying a zone of iron outside the DGP band in such form that it is readily available and accessible to plants, and iron uptake, and thus plant growth, is considerably enhanced.

Accordingly, a first series of tests, reported in Example I, below, was designed to test the response of grain sorghum to iron contained in the DGP mixtures, iron contained in hydrophilic polymer delivery systems, iron contained in FeEDDHA, and iron contained in iron sulfates. The application rates for iron were 18 and 24 mg of iron per kilogram of pot soil for all materials tested. The hydrophilic delivery systems were the same as those described in the preferred embodiments of Mortvedt, supra.

A second series of tests, reported in Example II, below, was designed to test the response of grain sorghum to iron contained in the DGP mixtures formulated with different chemical classes of hydrophilic polymer, the response to iron contained in hydrophilic polymer delivery systems which contained either no citric acid or which contained reagent grade citric acid, and the response to FeEDDHA and iron sulfate. The application rate for all iron source materials tested was 18 mg of iron per kilogram of pot soil.

A third series of tests, reported in Example III, below, was designed to test the response of corn growing in the field environment to iron contained in a DGP mixture formulated with a polyacrylamide polymer, or iron contained in iron sulfate, or iron contained in an iron sulfate/elemental sulfur/ citrate/iron-lignosulfonate mixture, or iron contained in two foliar spray applications of 1.5 percent iron sulfate as $FeSO_4$. In this example, the application rate of iron varied with each iron-source treatment.

In all series of tests, projected results correlate with the hypothesis that such DGP product and application procedure will very effectively act to enhance plant growth and improve iron nutrition. In addition, results correlate with the hypothesis that such procedure will very effectively act to focus plant root growth in the specific regions and areas of iron placement. Finally, such procedure will thereby provide a new, improved, economical, and highly efficient, delivery system for iron to preselected plants or plant pots.

Example I

In the tests comprising this example, iron sulfate, in the reduced state, was band applied according to the procedures outlined above to a calcareous iron-deficient soil of the type Epping silt loam either alone or in combination with the DGP mixture containing a polyacrylamide polymer, or in combination with hydrophilic polymer gels of varying chemical structure, to wit, a polyacrylamide, or a polyacrylamide plus polyacrylate. The procedure used to prepare the gels comprising the polymer and iron sulfate combination was as described in the description of the preferred embodiments in Mortvedt, supra. The resulting materials were subsurface band applied to soil forming about ¼ inch diameter bands onto the soil in the test pots. The synthetic chelate, FeEDDHA, also was similarly band applied alone to soil. All iron source materials were applied at two different rates, i.e., at 18 and at 24 mg of iron per kilogram of pot soil. It should be noted that in the test comprising this Example I, described in detail infra, typical 6-inch (150-millimeter) diameter greenhouse pots were used, with each 6-inch pot containing, on the average, 1 kilogram of iron-deficient soil. Also, typical to iron response tests, the potted crop was sorghum since it has long been used as a standard for such types of testing with 6 plants being maintained in each pot. See, for example, Aubra Mathers, Effect of ferrous sulfate and sulfuric acid on grain sorghum yields, *Agron. J.* 62:555–556 (1970). Typically, after six weeks' of growth in the greenhouse environment the above-ground plant forage was harvested, dried, and weighed to determine response to testing materials relative to sorghum grown in pots as standards. Post-harvest examination of the bands was made by slicing the soil longitudinally along the fertilizer band. Visual observations for treatment effects, as judged by the degree of chlorosis in plants, indicated that there were no differences in effectiveness between the DGP and FeEDDHA. However, sorghum forage yields and uptake of iron were highest with the DGP mixture, see Table VI, infra; the synthetic chelate FeEDDHA which was previously known to be the most effective iron fertilizer, ranked second below the DGP in yields and iron uptake. The hydrophilic polymer delivery system of Mortvedt, supra, ranked third. Crop response was lower still with $FeSO_4$ band applied alone. Post-harvest examination of soil showed well-hydrated, or gelled, bands of DGP into which roots had freely penetrated and proliferated. In addition, plant roots tended to be concentrated in the DGP band, and in an orange-colored diffusion zone around the DGP band, rather than evenly distributed throughout the plant growth media, i.e., an enhanced root growth region.

TABLE VI

| Test No. | Source/ Wt. % of Fe | Source/ Wt. % of Polymer[1] | Fe band applied to soil (mg/pot) | | | | | | | | |
|---|---|---|---|---|---|---|---|---|---|---|---|
| | | | 0 | 18 | 24 | 0 | 18 | 24 | 0 | 18 | 24 |
| | | | Chlorosis[2] | | | Yield, g/pot | | | Fe uptake, mg/pot | | |
| 1 | DGP[3] (1.0) | A (10) | — | A | A | — | 47.2 | 48.3 | — | 3.22 | 3.45 |
| 2 | Hydrogel[4] (0.12) | A (4.5) | — | B | B | — | 32.0 | 34.0 | — | 2.53 | 2.54 |
| 3 | Hydrogel (0.12) | B (4.5) | — | B | B | — | 27.0 | 28.1 | — | 2.02 | 2.29 |
| 4 | FeEDDHA (100) | — (0) | — | A | A | — | 42.7 | 49.1 | — | 2.83 | 2.39 |
| 5 | $FeSO_4$ (100) | — (0) | — | D | D | — | 17.2 | 17.7 | — | 0.73 | 0.78 |
| 6 | Control (0) | — (0) | D | — | — | 3.8 | — | — | 0.27 | — | — |

[1] A-polyacrylamide; B-commercial polyacrylamide and polyacrylate mixture (50% w/w).
[2] Chlorosis rating scale: A = none; B = slight; C = moderate; D = severe.
[3] DGP - dried gel particles consist of 7% polymer, 10% citric acid, 5% $FeSO_4$ to give an iron concentration of 1.0%).
[4] Hydrogel - fluid gel formulated to Mortvedt, supra.

Example II

In the tests comprising this example, the DGP, formulated with (Test No. 1, Table VI, supra) or without citric acid, and a polyacrylamide polymer, and four other different chemical classes of polymer (polyacrylamide/polyacrylate, cellulose ether, guar gum, and propenoate-propenamide) which contained citric acid, were compared against hydrophilic polymer delivery systems of Mortvedt, supra, which either contained or did not contain (Table VII, infra, Test No. 3 and 4) citric acid, for effectiveness as iron sources for grain sorghum. The same fertilizing, planting, and cropping procedures used in Example I, above, were followed in these tests. Both $FeSO_4$ and FeEDDHA were each band applied alone to soil and all iron sources were applied at a rate of 18 mg of iron per pot. As in Example I, supra, in this and subsequent examples, the reference to band application is understood to mean the procedure set forth in the introductory portion of this section. Crop response to the iron sources was greatest with the DGP formulated with a polyacrylamide polymer plus citric acid. The FeEDDHA treatment ranked second, and the hydrophilic delivery system of Mortvedt, supra, consisting of polyacrylamide and iron sulfate to which citric acid was added (Test No. 3) ranked third. Crop response was poorest with $FeSO_4$ alone. Although the DGP containing the propenoate-propenamide polymer (Test No. 9, infra) did not produce as satisfactory results as the other DGP, and it ranked below FeEDDHA and Test No. 3 in effectiveness, it nonetheless prevented iron chlorosis in the plants and is still less costly than the chelate. The same qualities of root penetration and proliferation as shown in Example I, supra, were again evident with all the DGP, although only the DGP containing the polyacrylamide and the cellulose ether manifested the orange-colored diffusion zone, supra. The ranking of the products in this test according to yields and iron uptake of plants is presented in Table VII, infra, wherein there is clearly demonstrated the superior attributes of the instant invention in this example and, further wherein is clearly shown that citric acid is an essential component of such systems, without which plant vigor and iron nutrition is much reduced.

TABLE VII

| Test No. | Source/ Wt. % of Fe | Source/ Wt. % of Polymer[1] | Citric acid Wt. % | Fe band applied to soil (18 mg/pot) | | |
|---|---|---|---|---|---|---|
| | | | | Chlorosis rating[2] | Yield, g/pot | Fe uptake, mg/pot |
| 1 | DGP[3] (1.0) | A (7) | 10.0 | A | 41.1 | 2.27 |
| 2 | DGP (1.0) | A (7) | — | D | 13.2 | 0.37 |
| 3 | Hydrogel[4] (0.12) | A (4.5) | 5.0 | A | 35.0 | 1.83 |
| 4 | Hydrogel (0.12) | A (4.5) | — | B | 30.2 | 1.29 |
| 5 | Hydrogel (0.12 | B (4.5) | 5.0 | B+ | 28.1 | 1.59 |
| 6 | Hydrogel (0.12 | B (4.5) | — | C | 20.7 | 1.01 |
| 7 | DGP (1.0) | C (7) | 10.0 | A | 33.0 | 2.06 |
| 8 | DGP (1.0) | D (7) | 10.0 | A | 32.9 | 2.11 |
| 9 | DGP (1.0) | E (10) | 10.0 | A | 27.1 | 1.60 |
| 10 | FeEDDHA (100) | — (0) | — | A | 39.1 | 1.83 |
| 11 | $FeSO_4$ (100) | — (0) | — | D | 11.4 | 0.45 |
| 12 | Control (0) | — (0) | — | D | 6.2 | 0.46 |

[1]A-polyacrylamide; B-commercial polyacrylamide and polyacrylate mixture (50% w/w); C-cellulose ether; D-guar gum; E-propenoate-propenamide.
[2]Chlorosis rating scale: A = none; B = slight; C = moderate; D = severe.
[3]DGP - dried gel particles consist of 7% polymer, 10% citric acid, 5% $FeSO_4$ (to give an iron concentration of 1.0%).
[4]Hydrogel - fluid gel formulated to Mortvedt, supra. The citric acid concentration of 5% was the maximum that could be absorbed in these gels. On a dry weight basis, the concentrations of iron, polymer, and citric acid are 9.63%, 90.4%, and 25%, respectively.

Example III

A third series of tests, reported below, was designed to test the response of corn to a polyacrylamide plus citric acid formulation of DGP in a field environment. The experiment was a factorial design using two corn varieties (tolerant and non-tolerant to high soil pH, designated as P3362 and P3398, respectively, in Table VIII, below) and five iron treatments applied in the seed furrow, plus an untreated check. Four replications of each treatment and of the untreated check were used. The experiment was established in Nebraska on three areas of Cozad silt loam soil that ranged in pH from slightly above neutral (pH 7.7) to calcareous (pH 8.6). Plot size was four individual rows 15 feet long with 30 inch spacing between rows. Iron source treatments consisted of DGP applied at 5 and 10 pounds of iron per acre (designated as DGP1 and DGP2 in Table VIII, below), iron sulfate applied at 50 pounds per acre (designated as $FeSO_4$ in Table VIII), an iron sulfate/elemental sulfur/citrate/iron-lignosulfonate mixture (designated as FeMIX in Table VIII) applied at 90 pounds per acre, or two foliar spray applications of 1.5 percent iron sulfate as $FeSO_4$ (designated as FOLIAR in Table VIII). Measures of treatment effectiveness were plant height, the chlorophyll content of leaves (since iron is essential for chlorophyll formation), and yields of corn grain reported as bushels per acre. An increase in plant height and in the leaf chlorophyll content are at least strong indicators of increased plant vigor, while an increase in yield is the final definitive measure of product effectiveness. The effectiveness of the DGP as an iron source in calcareous soil (site 1) is clearly shown in Table VIII, where plant height and leaf chlorophyll content (both measured 80 days after planting), and final grain yields are significantly greater with the DGP applications than with the other iron source treatments. Moreover, the DGP treatments resulted significant improvement in the three measured parameters for the crop variety which has been developed to be less susceptible to iron deficiency, which was an even stronger indication of the efficacy of the DGP materials. In addition, photographic documentation, commencing at an early stage of plant growth and development (14 days) and continuing until plant senescence and harvest of grain (120 days) clearly showed the dramatic differences in the plant height and green color of plants treated with DGP and further substantiated the actual measurements shown in Table VIII. As pointed out in the description of the prior art, supra, iron deficiency occurs most frequently in calcareous, high pH soils, and chlorosis occurs most usually in plants grown therein, but usually with decreasing occurrence and severity as soils tend towards a neutral pH. Correction of chlorosis is also the most difficult in such soils, and in general, tends to be more easily corrected as soils tend toward a neutral pH if, indeed, the problem occurs at all. The vigor and yields of the plants grown on Site 2 and Site 3 support this contention, while the increase in plant vigor and yields on Site 1 demonstrate the efficacy of the DGP product.

The exact location of the original test plots was mapped at the end of the growing season. A corn crop was then planted one year later in the plots to test for residual effects of the DGP treatments. No additional DGP or other iron source was applied at planting. Photographic documentation clearly showed a response to the original DGP application, as evidenced by a marked increase in plant vigor (plant height, growth rate, and absence of chlorosis) over plants growing in other areas of the test plots. This response was evident throughout the entire growing season. The plants growing in plots which had received other treatments listed in Table VIII, supra, the previous year were stunted and chlorotic. This clearly indicates the long-term efficacy of the DGP, and supports the economic viability of the DGP since yearly applications may be unnecessary.

TABLE VIII

| Test No. | Variety[1] | Iron Treatment[2] | Plant Height Site[3] | | | Chlorophyll Meter Site | | | Yield, bu/A Site | | |
|---|---|---|---|---|---|---|---|---|---|---|---|
| | | | 1 | 2 | 3 | 1 | 2 | 3 | 1 | 2 | 3 |
| 1 | P3362 | Check | 14.8 | 21.8 | 28.3 | 12.3 | 52.1 | 53.4 | 44 | 174 | 181 |
| 2 | | FOLIAR | 17.0 | 22.8 | 26.5 | 25.1 | 53.1 | 55.5 | 80 | 180 | 195 |
| 3 | | FeSO$_4$ | 19.5 | 23.3 | 29.5 | 32.9 | 54.5 | 55.9 | 98 | 181 | 199 |
| 4 | | FEMIX | 20.3 | 25.0 | 28.3 | 27.1 | 53.3 | 54.1 | 102 | 185 | 186 |
| 5 | | DGP1 | 22.8 | 24.5 | 28.3 | 46.8 | 51.5 | 54.8 | 133 | 176 | 198 |
| 6 | | DGP2 | 22.3 | 24.8 | 29.3 | 47.9 | 55.5 | 56.0 | 131 | 182 | 188 |
| 7 | P3398 | Check | 6.3 | 20.8 | 25.0 | 4.4 | 49.1 | 51.1 | 1 | 164 | 179 |
| 8 | | FOLIAR | 8.0 | 22.0 | 24.3 | 14.5 | 47.3 | 51.9 | 6 | 174 | 176 |
| 9 | | FeSO$_4$ | 17.5 | 23.0 | 24.8 | 12.3 | 49.4 | 50.5 | 26 | 170 | 182 |
| 10 | | FEMIX | 19.5 | 22.0 | 27.0 | 20.9 | 51.4 | 52.5 | 44 | 178 | 182 |
| 11 | | DGP1 | 23.8 | 24.8 | 26.2 | 45.7 | 52.2 | 53.6 | 102 | 173 | 183 |
| 12 | | DGP2 | 24.3 | 24.0 | 26.0 | 51.3 | 51.6 | 52.8 | 110 | 178 | 184 |

[1]Variety P3362 is a Pioneer, high pH-iron deficiency tolerant variety; Variety P3398 is a Pioneer, high pH-iron deficiency susceptible variety.
[2]Check-no applied iron; FOLIAR-two foliar spray applications of 1.5% iron sulfate; FeSO4-iron sulfate applied at 50 lb/A; FEMIX-iron sulfate/elemental sulfur/citrate/iron-liqnosulfonate mixture applied at 90 lb/A; DGP-dried gel particles contain 7.0% polyacrylamide, 10.0% citric acid, and 5.0% FeSO$_4$ (to give an iron concentration of 1.0%). DGP1 - applied at 5 lb Fe/A; DGP2 - applied at 10 lb Fe/A.
[3]Site 1: Calcareous - pH 8.6; Site 2: Slightly calcareous - pH 8.2: Site 3: Near neutral - pH 7.7.

INVENTION PARAMETERS

After sifting and winnowing through the data herein presented, as well as other results and operations of our new, novel, and improved technique, including methods and means for the effecting thereof, the operating variables, including the acceptable and preferred conditions for carrying out our invention are summarized below:

| Variables | Operating Limits[1] | Preferred Limits[1] | Most Preferred Limits[1] |
|---|---|---|---|
| Polymer[2] | 1–15% | 5–15% | 7% |
| | (14–60) | (30–38) | (32) |
| Iron Sulfate | 1–15% | 3–10% | 5% |
| | (14–30) | (20–25) | (23) |
| Citric Acid | 5–20% | 5–15% | 10% |
| | (0.7–50) | (38–50) | (45) |
| Water | ≦93% | ≦87% | 78% |
| Film Thickness of Undried Hydrogel | 1/8"–1/2" | 1/4"–1/2" | 1/4" |
| Drying Temperature (°C.) | 90–120 | 100–110 | 105 |
| Time of Effective Drying (h) | 4–20 | 10–16 | 10 |

[1]Concentrations of polymer, iron sulfate, and citric acid, on a weight basis, in formulations on a per kilogram basis after mixing with deionized water, but before drying. Approximate concentrations after drying shown in parenthesis. Final concentrations of ingredients on a dry weight basis may total less than 100% due to water loss during drying. The solvation capacity of a given polymer often limits the amounts of soluble salts (i.e., sulfates and/or citrates) contained in the final, dried product.
[2]Crosslinked polyacrylamide, polyacrylate, guar gum, cellulose ether, or propenoate-propenamide, preferably from about 1 to about 5% crosslinking, and most preferably from about 1 to about 3% crosslinking (above about 10% crosslinking could result in a plastic or solid material before drying, with insufficient absorption of iron and citric acid), or a natural guar polymer with no crosslinking.

While we have shown and described particular embodiments of our invention, modifications and variations thereof will occur to those skilled in the art. We wish it to be understood therefore that the appended claims are intended to cover such modifications and variations which are within the true scope and spirit of our invention.

What we claim as new and desire to secure by Letters of Patent of the United States is:

1. A process for providing substantial isolation of water-soluble iron source micronutrient juxtaposed plant growth media to thereby inhibit degradation of said micronutrient; said micronutrient comprising iron sulfate and said process comprising the steps of:

(a) mixing predetermined amounts of aqueous media, iron sulfate, and at least one hydroxy acid selected from the group consisting of citric acid, lactic acid, malic acid, tartaric acid, and mixtures thereof to effect a solution containing by weight between about 1 percent to about 15 percent iron sulfate and between about 5 percent to about 20 percent of said at least one hydroxy acid;

(b) subsequently mixing, with at least a portion of the solution effected in step (a), supra, a predetermined amount of hydrophilic polymer sufficient to effect a resulting solution containing by weight from about 1 percent to about 15 percent of said polymer;

(c) providing sufficient agitation of the solution resulting in step (b), supra, to effect a phase change from a liquid to a gel and thereafter removing at least a portion of the resulting iron sulfate-hydroxy acid containing hydrogel to means for dehydration;

(d) maintaining the gel material introduced into the hydrating means in step (c), supra, for a time and at a temperature to remove therefrom sufficient moisture to effect a resulting friable, dried hydrogel;

(e) removing at least a portion of the resulting friable, dried hydrogel effected in step (d), supra, to comminuting and sizing means wherefrom is removed product material; and (f) subsequently applying at least a portion of said product material recovered in step (e), supra, to a situs comprising plant growth media whereby is provided effective isolation of said water-soluble iron source micronutrient from the deleterious effects of reaction with said plant growth media.

2. The process of claim 1, wherein said hydrophilic polymer is selected from the group consisting of polyacrylamide, guar gum, polyacrylate, cellulose ether, propenoate-propenamide, and mixtures thereof.

3. The process of claim 2, wherein said hydroxy acid is citric acid.

4. The process of claim 3, wherein said polymer content ranges from between about 5 percent and 15 percent, wherein said citric acid ranges from between about 5 percent and 15 percent, wherein said iron sulfate ranges between about 3 percent and about 10 percent, and wherein the period of time in which the degradation of said iron constituent is inhibited, ranges from between about 28 days to about 2 years.

5. The process of claim 3, wherein said polymer content is about 7 percent, wherein said citric acid is about 10 percent, wherein said iron sulfate is about 5 percent, and wherein the period of time in which the degradation of said iron constituent is inhibited, ranges from between about 28 days to about 2 years.

6. The process of claim 4, wherein the drying of said hydrogel is effected at temperatures ranging between about 90° C. to about 120° C. and for a period of time ranging from about 4 hours to about 20 hours.

7. The process of claim 5, wherein the drying of said hydrogel is effected at temperatures ranging between about 90° C. to about 120° C. and for a period of time ranging from about 4 hours to about 20 hours.

8. The process of claim 6, wherein said temperature ranges from about 100° C. to about 110° C., and said period of time for drying ranges from about 10 hours to about 16 hours.

9. The process of claim 7, wherein said temperature ranges from about 100° C. to about 110° C., and said period of time for drying ranges from about 10 hours to about 16 hours.

10. The process of claim 8, wherein the drying of said hydrogel is effected by forming at least one relatively thin sheet thereof for exposure to said temperature during said period of drying, and wherein the thickness thereof ranges from about ⅛ inch to about ½ inch.

11. The process of claim 9, wherein the drying of said hydrogel is effected by forming at least one relatively thin sheet thereof for exposure to said temperature during said period of drying, and wherein the thickness thereof ranges from about ⅛ inch to about ½ inch.

* * * * *